(No Model.)

J. J. RUFE.
GOVERNOR FOR MECHANICAL POWERS.

No. 276,080. Patented Apr. 17, 1883.

Witnesses.
A. Ruppert.
D. S. Holloway

Inventor:
John J. Rufe.
per
H. J. England
Atty.

UNITED STATES PATENT OFFICE.

JOHN JAMES RUFE, OF DOYLESTOWN, PENNSYLVANIA.

GOVERNOR FOR MECHANICAL POWERS.

SPECIFICATION forming part of Letters Patent No. 276,080, dated April 17, 1883.

Application filed March 21, 1883. (No model.)

*To all whom it may concern:*

Be it known that I, JOHN J. RUFE, a citizen of the United States, residing at Doylestown, in the county of Bucks and State of Pennsylvania, have invented certain new and useful Improvements in Governors for Mechanical Powers, of which the following is a specification, reference being had therein to the accompanying drawings.

My invention relates to certain new and useful improvements in speed-governors, and has for its object the construction of a device that will control the speed of a machine or mechanical power, and by means of which said machines or mechanical powers can be regulated to run at a given rate of speed, and at the moment any excess of speed is developed said governor acts instantly to check the same and reduce the revolutions to the number desired.

Figure 1:
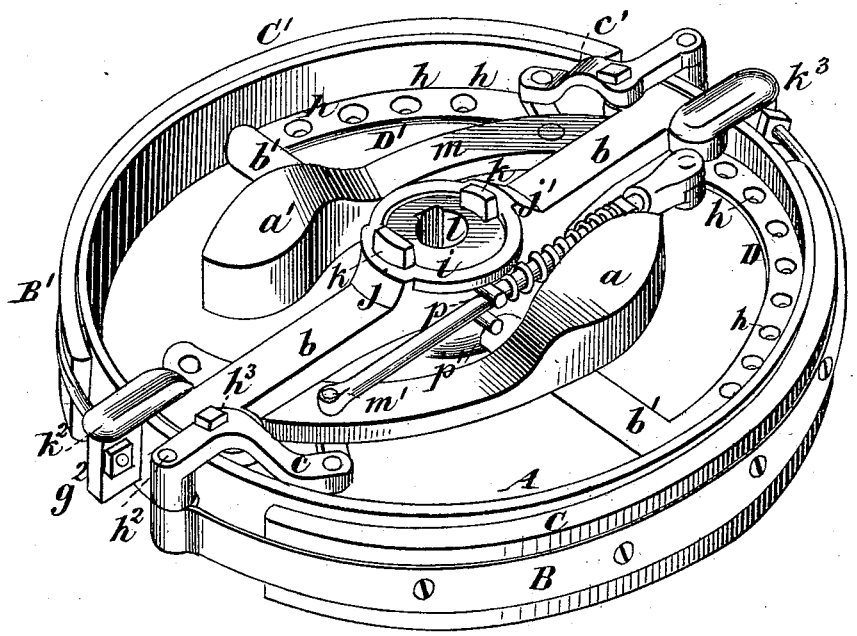
Figure 2:
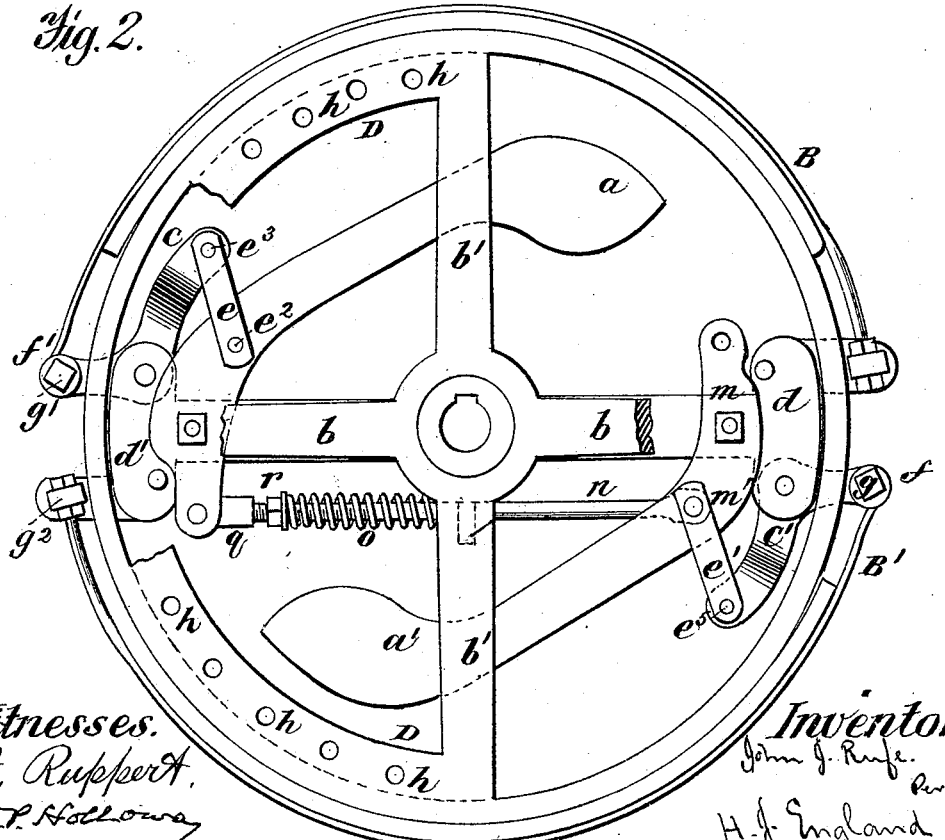

Reference is to be had to the drawings forming part of this application, in which Figure 1 is a perspective view of my improved governor, showing the parts in place and closed, with band released from wheel. Fig. 2 is a rear plan view of the same, showing the parts in place and extended, with band tight on wheel.

Similar letters refer to similar parts throughout the drawings.

Referring to the drawings, A represents a wheel having a wide rim, spokes, or arms, and a perforated hub. Said wheel is formed with perforated flanges extending inward at right angles from the inner edge of the rim. I do not confine myself to the precise construction shown of wheel A, as any other suitable form may be used without deviating from the spirit of my invention. The projecting flanges D are curved on their inner edges to conform to the periphery of the wheel in shape, said flanges having perforations $h$ $h$ $h$ $h$ for the purpose of securing said wheel to the frame of the horse-power, elevator, or other mechanical power when used.

Working within the rim of wheel A is a spider or arm, $b$, having a central orifice or opening, $l$, formed with an inclined recess for the reception of a key. The purpose of opening C is to receive a drive-shaft, to which said spider is rigidly secured by inserting a key in the inclined recess in said opening. On opposite sides of opening $l$, in line with said spider or arm, and upon its outer face is formed two projecting lugs, $k$ and $k'$, the purpose of which is to engage with a corresponding recess in an opposite wheel. (Not shown.)

Two levers or arms, $a$ and $a'$, are formed with their outer ends enlarged or weighted, and conform to a certain extent to the shape of the wheel, as shown in Figs. 1 and 2. A short distance from their inner ends said lever-arms are pivoted to spider $b$, near the outer ends of the same, by means of bolts $m$.

Spider $b$ is formed with a cross T on each end of the same. One end of said T, on both ends of the spider, is perforated to receive a bolt, and the opposite ends are formed with projecting lugs $k^2$ and $k^3$, that extend beyond the outer edge of the rim of wheel A, said projections being extended at right angles to the same a short distance beyond the center of the periphery of said wheel. The purpose of the right-angular projections is to secure one end of belt or band B′, and for this purpose a perforation is made in each of said right-angular projections.

To the inner end of the weighted arm $a$ is pivoted by means of a screw-bolt an inwardly-screw-threaded socket, $y$, formed to receive a screw-threaded connecting-rod, $n$, the opposite end of said rod being pivoted to arm $a'$ between its outer end and the spider and a short distance from the latter.

A nut or burr, $r$, is screwed onto rod $n$ a short distance from the socket $y$. A coiled spring, $o$, surrounds a portion of connecting-rod $n$. One end of said spring rests against nut $r$, and the opposite end against the projections $p$ and $p'$, extending outward from the center of spider $b$, as shown in Fig. 1. The purpose of said spring is to counteract the outward tendency of the weighted ends of arms $a$ and $a'$, and contract or retire said arms near to the spider when the speed is reduced; and, furthermore, the speed is regulated to the point desired by turning the nut $r$, to increase or decrease the tension of spring $o$.

To one end of spider-arm $b$ is pivoted, by means of bolt $h^3$, through a perforation in said T-shaped end, a rock-arm, $c'$. Said rock-arm is formed triangular in shape, with its inner end curved downward and its outer end extending beyond the rim of wheel A nearly straight. Bolt $h^3$ passes through the knee or angle of said rock-arm $c'$, and on said bolt the rock-arm $c'$ freely turns. The outer end of said rock-arm $c'$ is formed with a right-angular projection, $h^2$, extending nearly across the periphery of wheel A, the inner curved end of said rock-arm being loosely pivoted to connecting-rod $e'$, the opposite end of which is pivoted to the weighted arm $a'$ by means of the pivot-bolt $m'$, that passes through one end of connecting-rod $n$ and arm $a'$, near its end and a short distance from spider-arm $b$. To the opposite end of spider-arm $b$, on T-shaped projection, is loosely pivoted rock-arm $c$, similar in construction and pivoted to connecting-rod $e$, that is in turn pivoted at its opposite end to the weighted arm $a$ a short distance from the spider-arm $b$. Said rock-arm $c$ is formed with a projection, $g'$, extending nearly across the outer face of wheel A. To the projection $g'$ is secured one end of belt or band B, that is formed of wood, metal, or any other suitable material. Said band passes loosely around one-half of wheel A, and is secured by its opposite end to projection $g^2$, that is secured by lug $k^2$ to the spider-arm $b$.

An opposite band, B', is secured at one end to projection $h^2$ on the end of rock-arm $c'$, and at the opposite end to projection on lug $k^3$. Said band is formed similar to band B and of similar material. The construction and arrangement of the parts are clearly shown in Figs. 1 and 2.

The operation of the device is as follows: The governor is keyed onto the drive-shaft and set by means of the set-nut $r$, pressing against one end of coiled spring $o$ on rod $n$ to run at a certain number of revolutions, or at a certain degree of speed desirable, and so long as that degree of speed is maintained the balls or weighted ends of arms $a$ and $a'$ remain in the position set; but the moment the speed is accelerated the weighted ends by centrifugal force are thrown outward, the bands B and B' are drawn tightly against the outer face of wheel A, and by friction arrest the progress of wheel A and slacken the speed to the desired point or the point first set.

Having thus described my invention, what I desire to secure by Letters Patent and claim is—

1. A speed-governor consisting of a wheel adapted to be secured to a machine or its frame, and a spider or cross-arm working within said wheel and having weighted arms pivoted thereon, said spider and weighted arms connected to friction belts or bands, with means for regulating the movements of said arms, substantially as and for the purpose set forth.

2. A speed-governor consisting of a wheel formed with a central hub, radiating arms or spokes, a wide rim with inwardly-projecting perforated flanges, and a spider or cross-arm formed with a central perforated hub having projecting lugs, the outer ends of said spider-arm being connected to clamping-bands and weighted swinging levers, with mechanism for adjusting the same, substantially as and for the purpose set forth.

3. In a speed-governor, a metal wheel formed as described, a metal spider-arm formed with central perforated hub, said hub having projecting lugs, and a pair of weighted levers pivoted on said spider-arm and connected by an adjustable metal rod, said arms being connected by rock-arms and projecting lugs to clamp-bands, substantially as and for the purpose set forth.

4. The combination of the wheel A, having inwardly-projecting flanges $h\ h\ h$, with the spider $b$, projecting lugs $k^2$ and $k^3$, rock-arms $c$ and $c'$, having projections $h^2$, bands B and B', connecting-rods $e$ and $e'$, weighted arms $a$ and $a'$, connecting-rod $n$, socket $y$, nut $r$, projections $p$ and $p'$, and coiled spring $o$, substantially as shown and specified.

In testimony whereof I affix my signature in presence of two witnesses.

JOHN JAMES RUFE.

Witnesses:
 H. B. ZEVELY,
 H. J. ENGLAND.